United States Patent [19]

Shields

[11] 4,003,278
[45] Jan. 18, 1977

[54] TUBE CUTTING APPARATUS
[75] Inventor: John Tipton Shields, Jackson, Miss.
[73] Assignee: Jackes-Evans Manufacturing Company, St. Louis, Mo.
[22] Filed: Mar. 14, 1975
[21] Appl. No.: 558,484
[52] U.S. Cl. .............................. 83/186; 83/179; 83/206; 83/241; 83/277; 83/698; 226/150; 226/162
[51] Int. Cl.² .............................. B23D 21/14
[58] Field of Search ............ 83/78, 105, 186, 145, 83/181, 182, 184, 185, 186, 190, 192, 203, 206, 241, 277, 391, 402, 409, 412, 437, 452, 461, 465, 466, 698; 198/218; 226/150, 162; 214/1.1, 1.4

[56] References Cited
UNITED STATES PATENTS

| 2,627,921 | 2/1953 | Brehm | 83/184 |
|---|---|---|---|
| 2,990,742 | 7/1961 | Jackson | 83/186 |
| 3,171,312 | 3/1965 | Fuchs, Jr. et al. | 83/277 |
| 3,735,907 | 5/1973 | Kuchar et al. | 226/150 |

Primary Examiner—Leonidas Vlachos
Assistant Examiner—W. D. Bray
Attorney, Agent, or Firm—Haight, Hofeldt, Davis & Jambor

[57] ABSTRACT

A device for cutting lengths of tubing from a longer tube utilizes an external pair of cutting dies and an internal pair of punches. An eccentric relative motion ("shimmy") of the cutting dies results in the desired cutting of the tube. The punches are inserted into the tube from the end of the tube from which the length of tubing is to be cut. A restraining arrangement prevents the punches from moving farther along the tube than is desired, while a punch positioning mechanism prevents movement of the punches toward the open end of the tube. Thus, the internal punches are accurately positioned with respect to the external cutting dies. A centering arrangement is utilized to insure coaxiality of the punches. After the cutting dies have been actuated to cut the tube, the tube is advanced an amount corresponding to the length of tubing to be cut, after which the punch positioning mechanism is reciprocally withdrawn to permit the cut length of tubing to be discharged and then reinserted to position the punches for the next cutting operation. During the cutting operation the punches are held in the desired position between the punch positioning mechanism and the restraining arrangement. Various types of restraining means may be utilized to hold the punches, and the resistance of the restraining means to further movement along the tube may be adjusted to any desired level.

34 Claims, 26 Drawing Figures

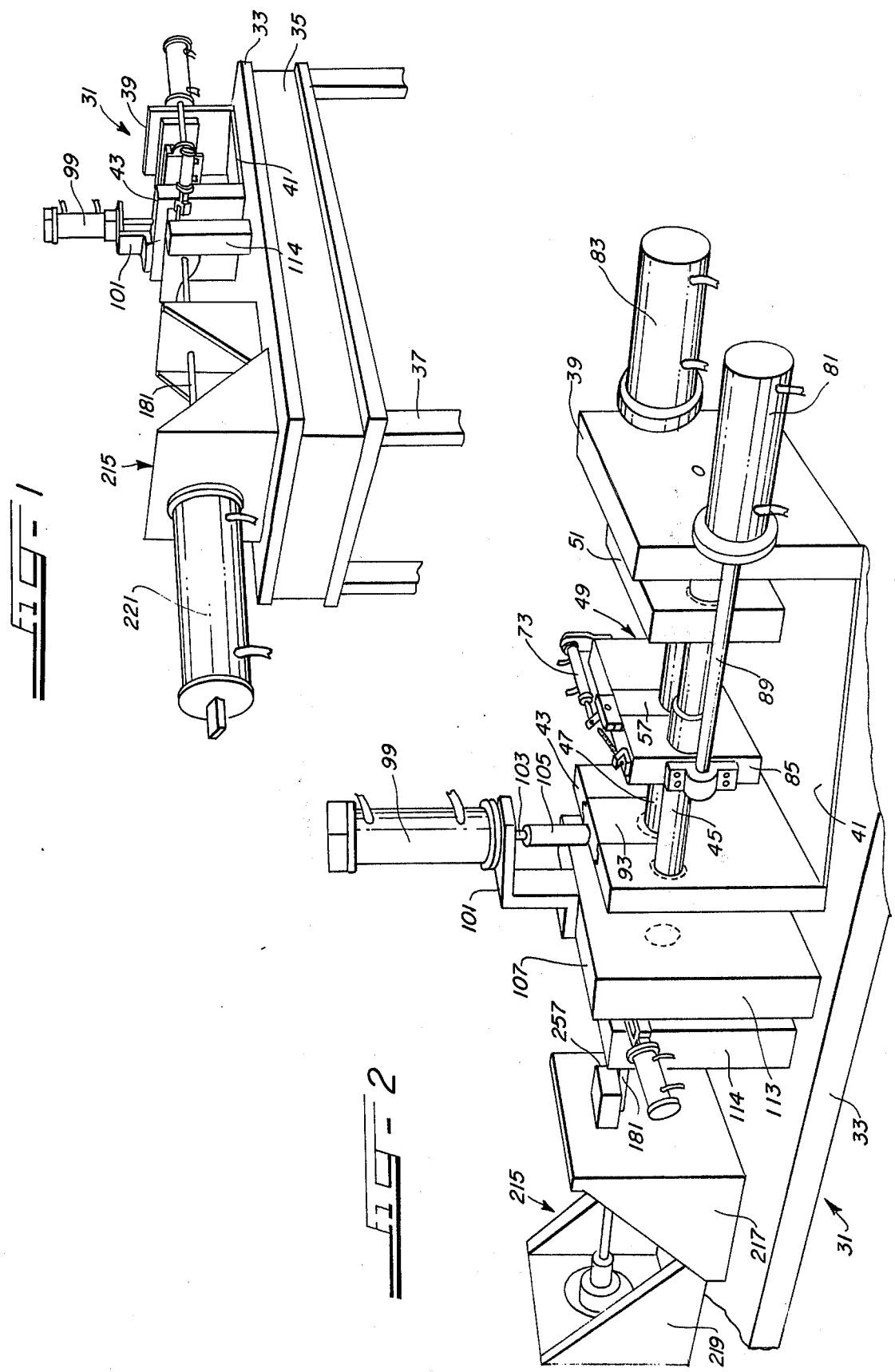

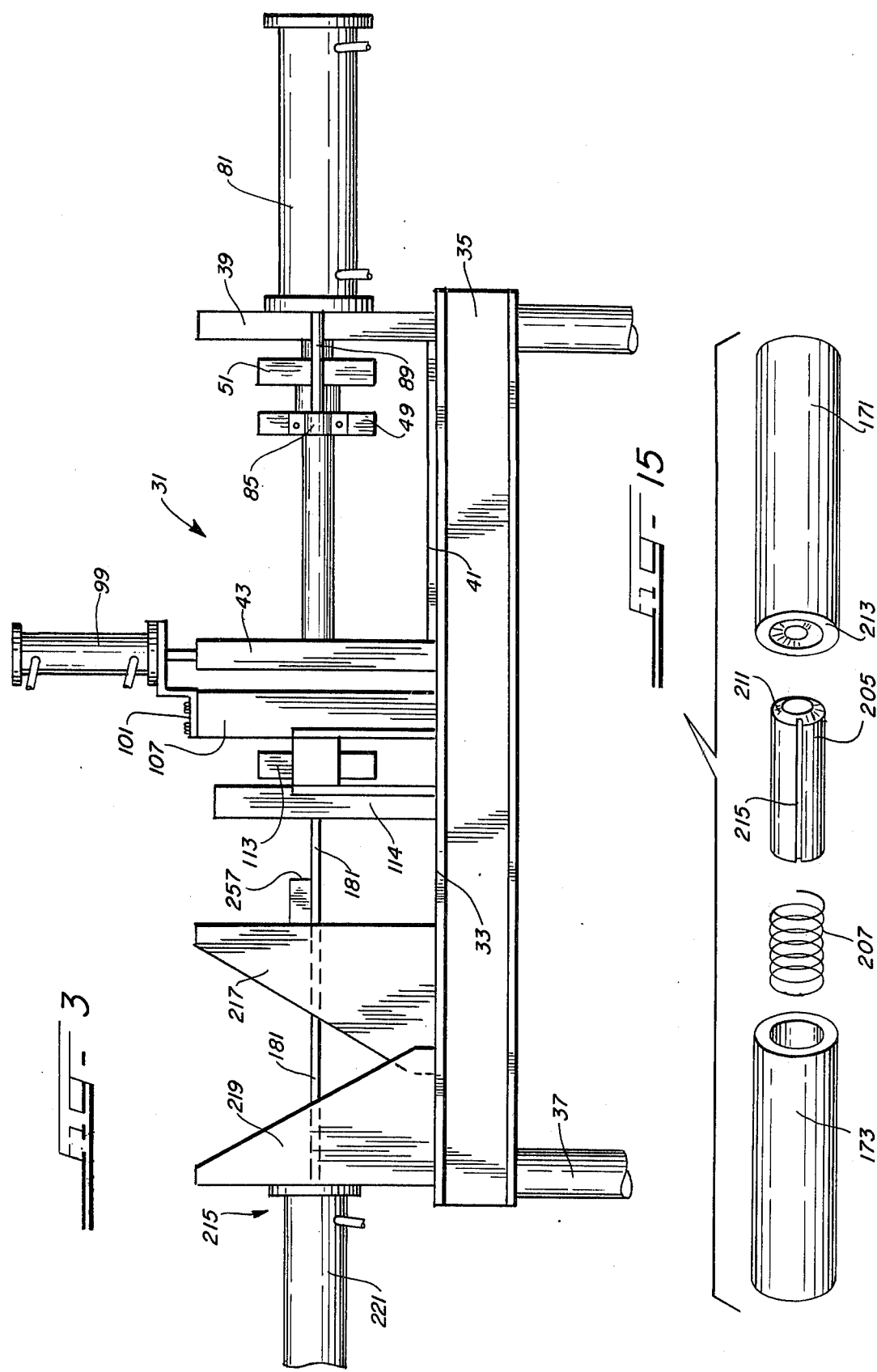

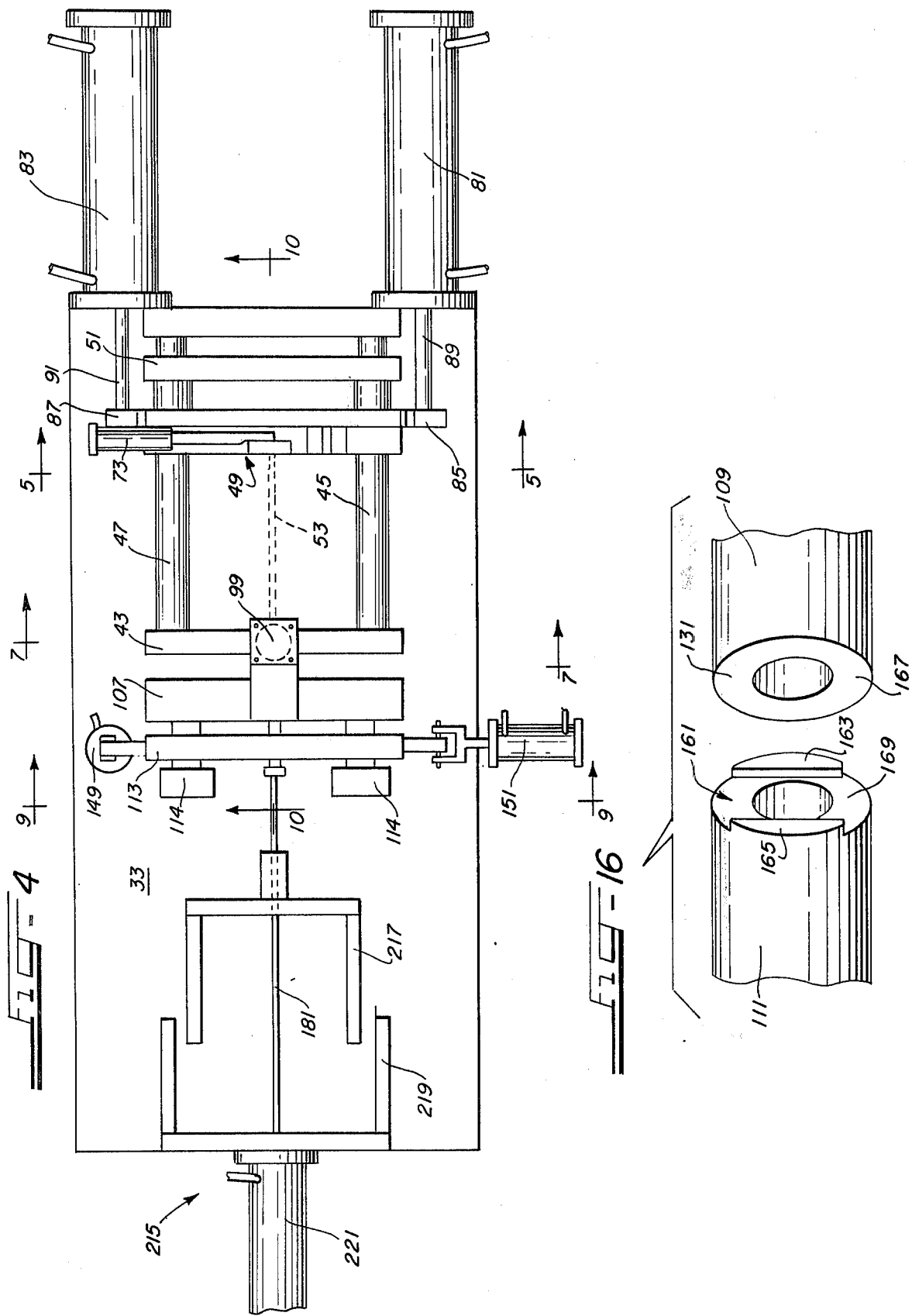

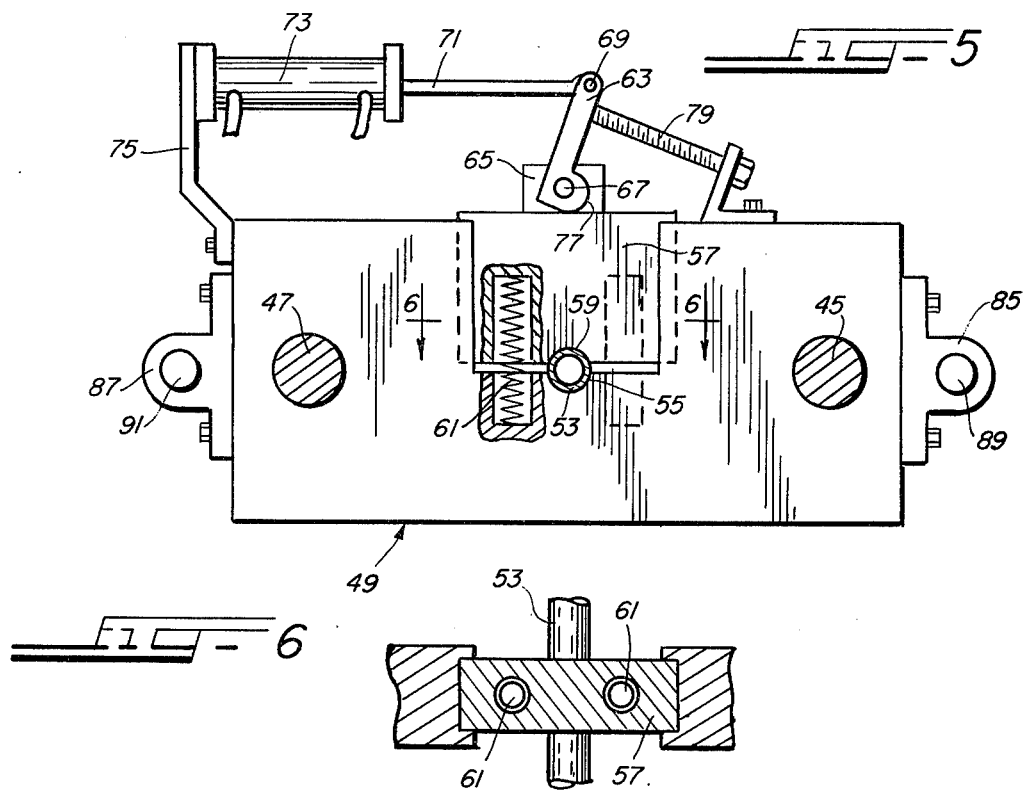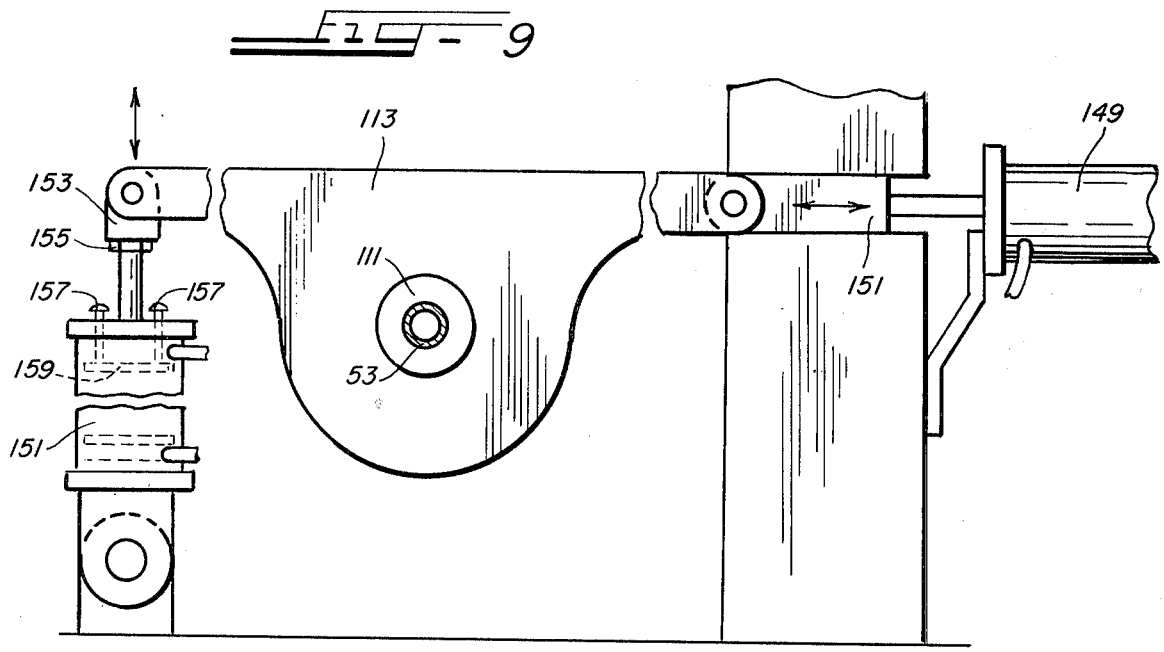

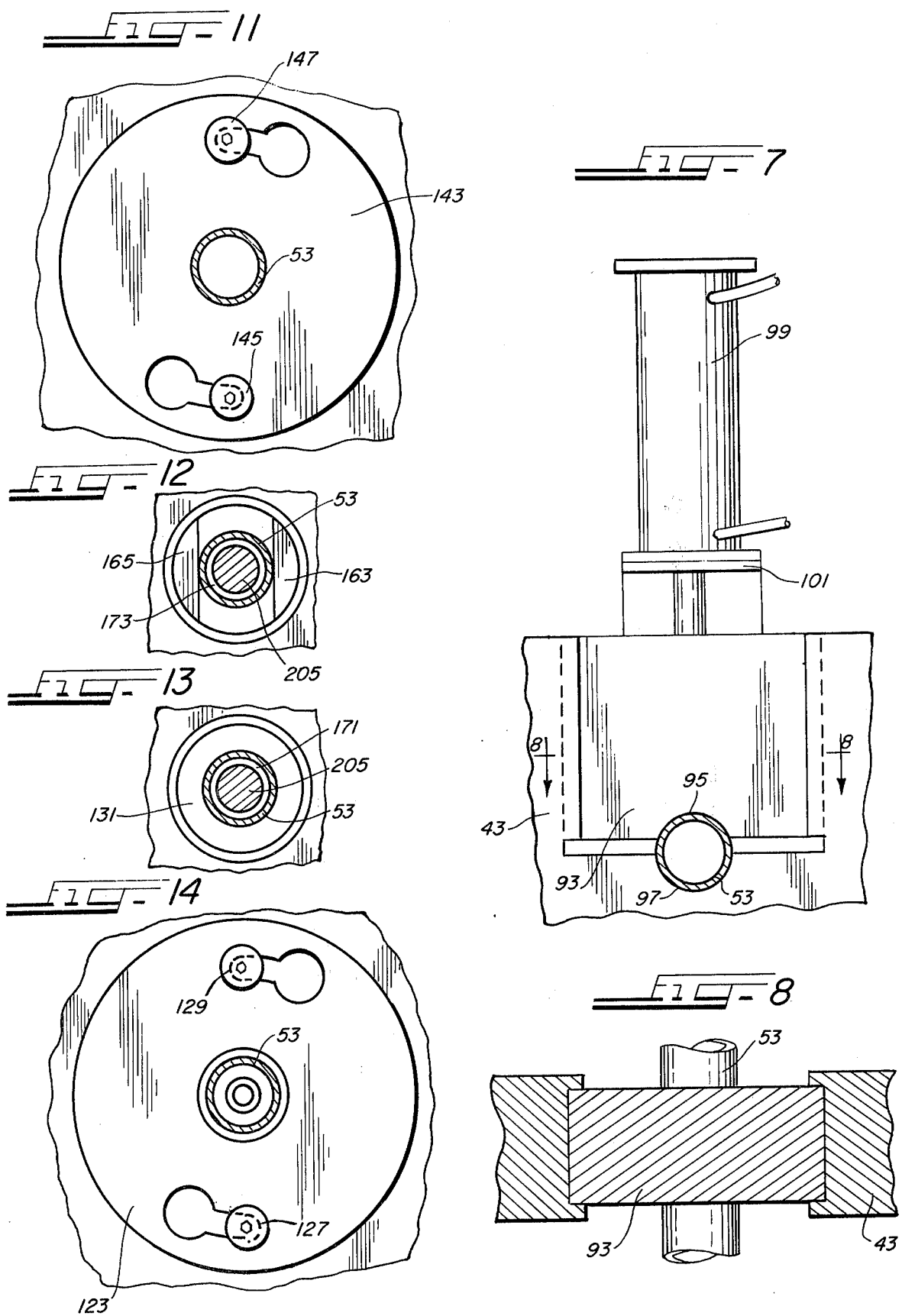

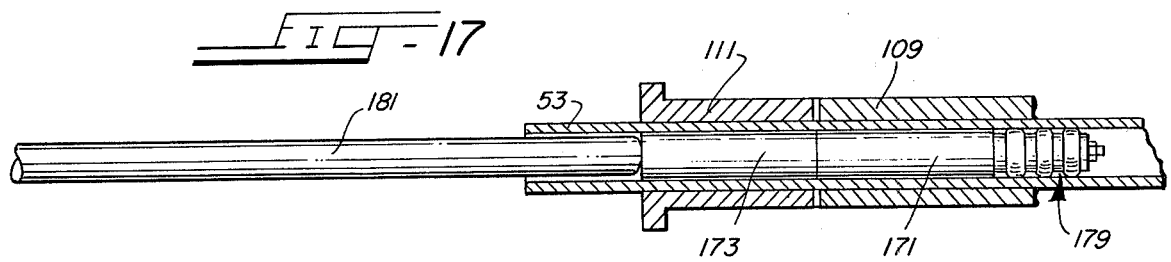
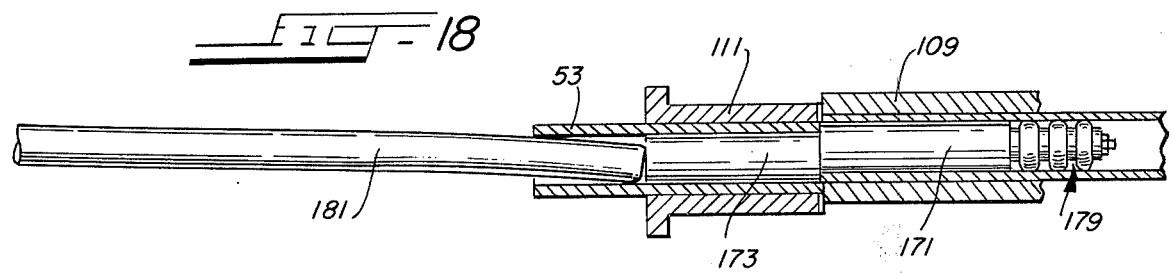
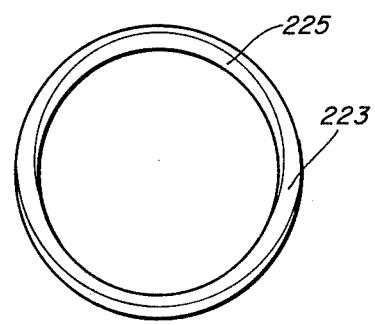
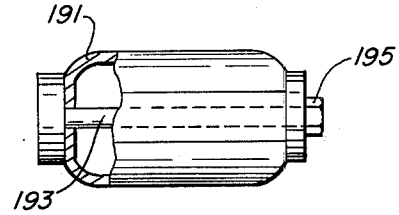
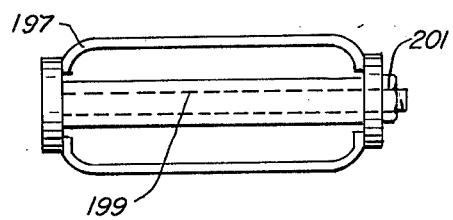
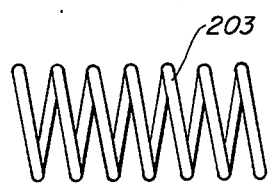

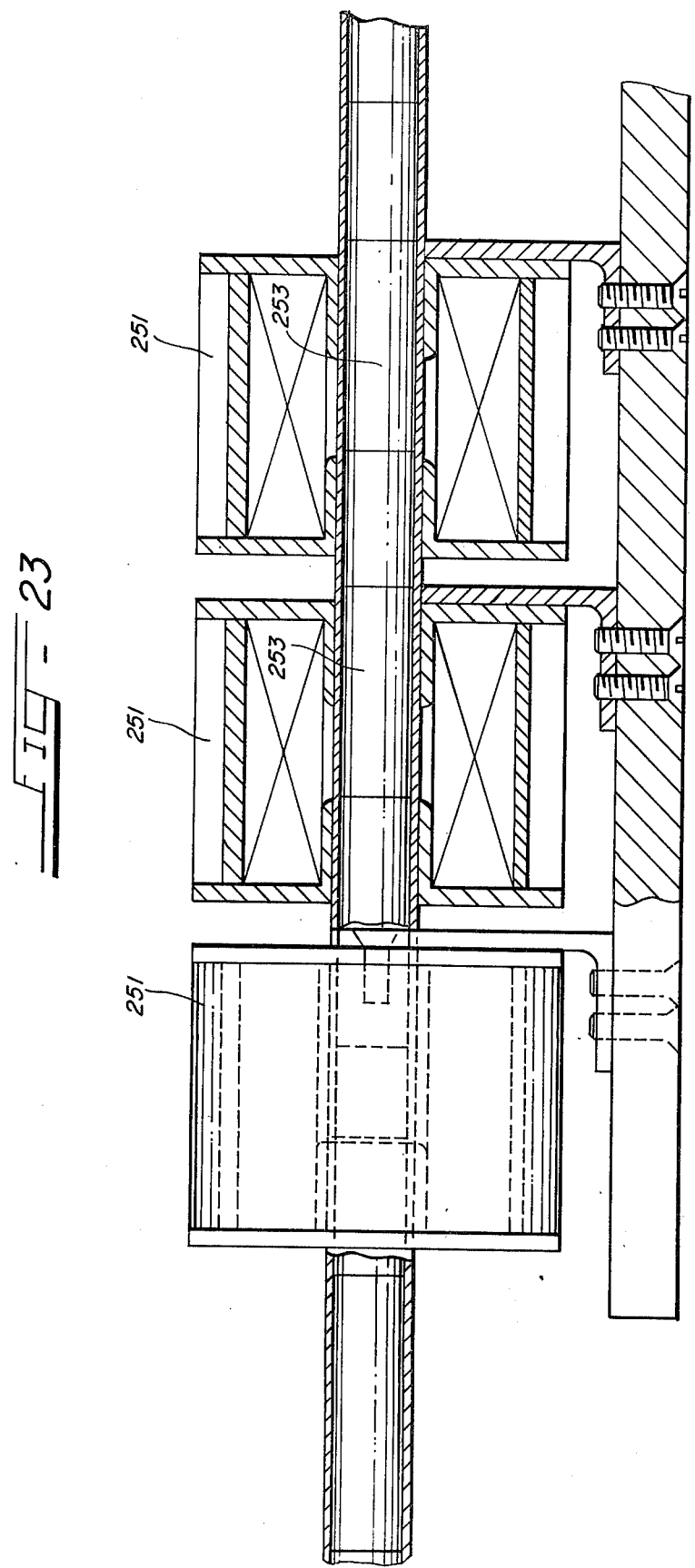

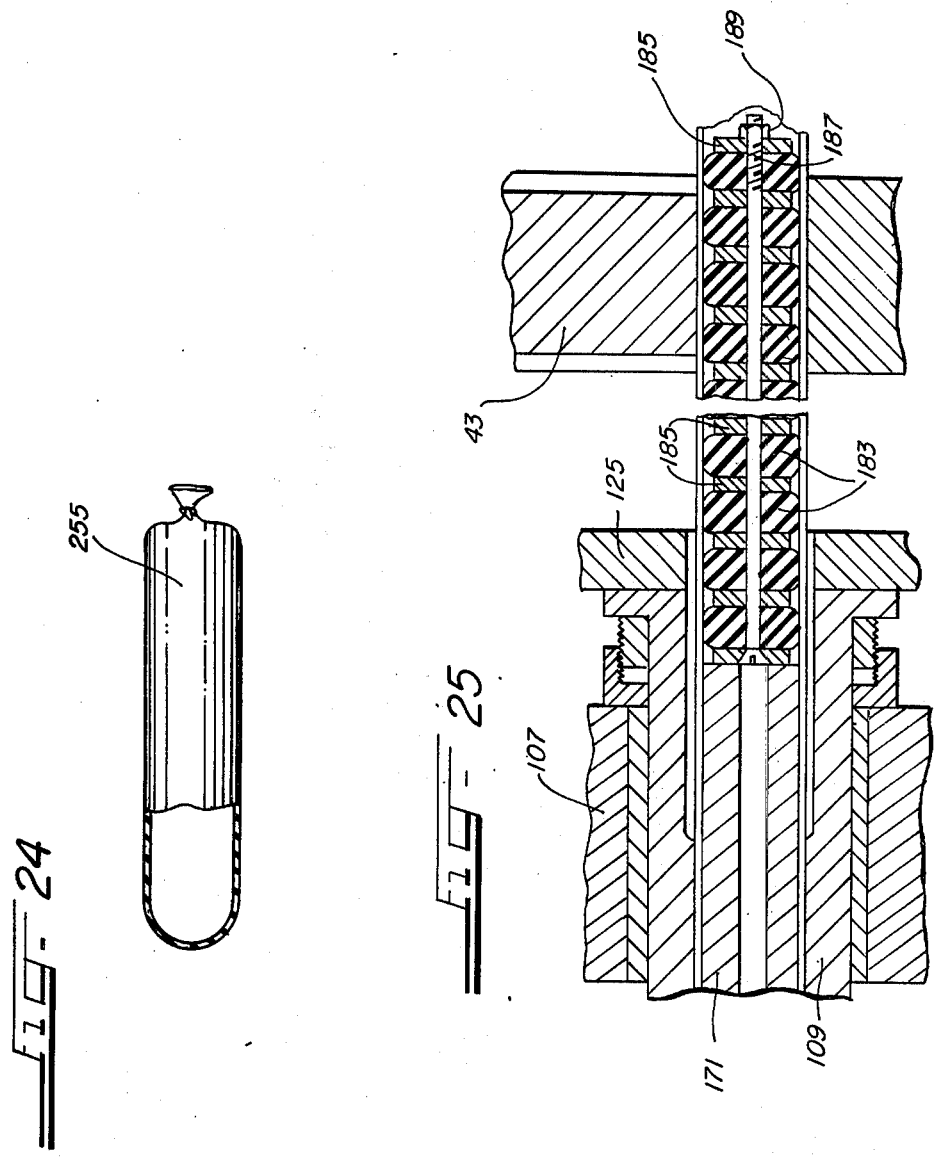

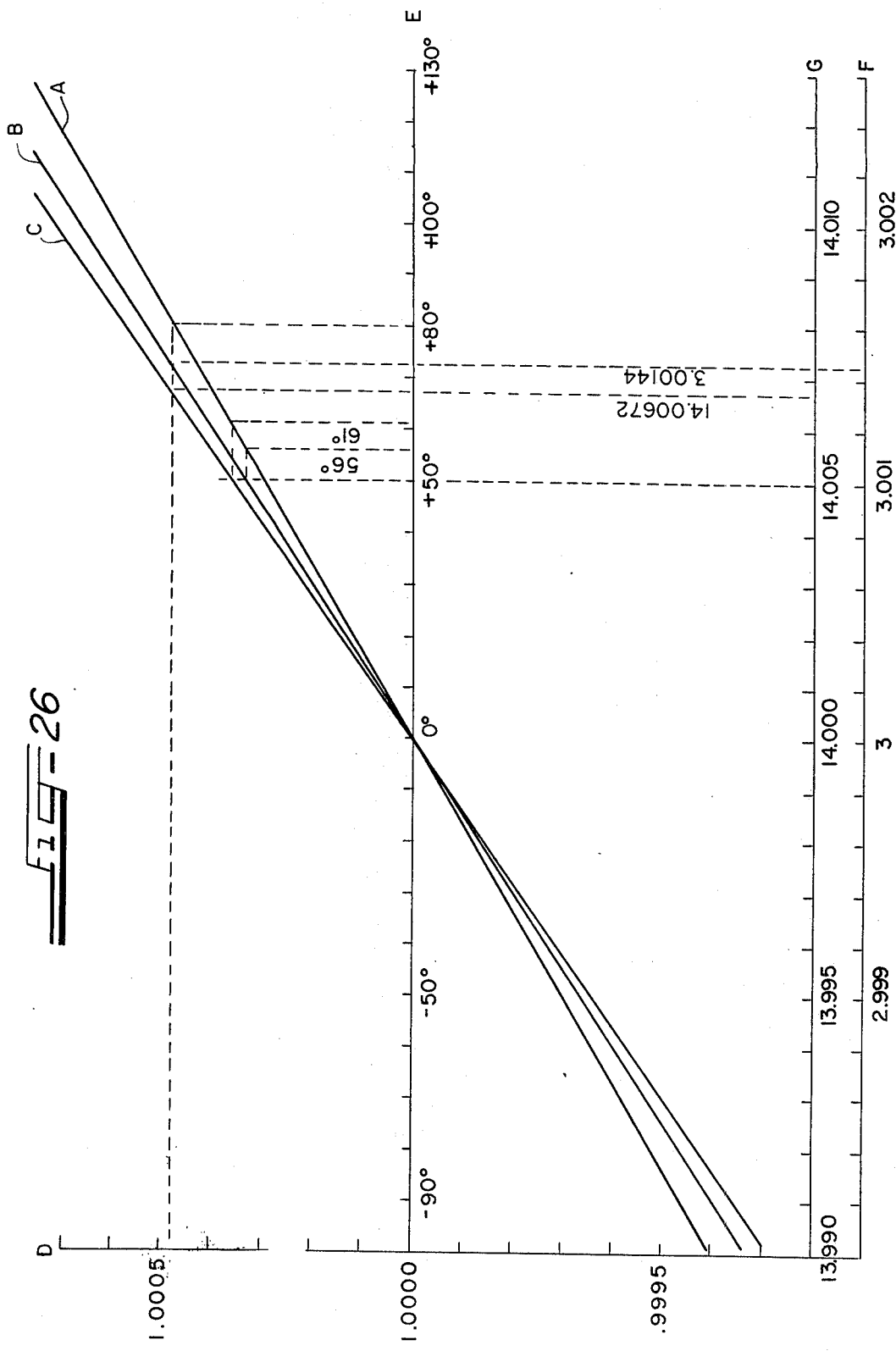

TUBE CUTTING APPARATUS

BACKGROUND OF THE INVENTION

1. Field of the Invention

This invention relates generally to an apparatus for cutting relatively short lengths of tubing from a longer tube, and more specifically, this invention relates to a tube cutting apparatus of the "shimmy die" type.

2. Description of the Prior Art

Over the years there have been many attempts to produce machines that could cut relatively long lengths of tube into desired shorter tubing lengths. For example, there has been the "cutting roll" or "pinch roll" approach exemplified by the Bertoletti device, which operated on the same principle as the pipe cutters utilized by plumbers. Another effort involved the "screw" machine, in which a stationary knife bears against a tube that is rotated. Both of these devices have the disadvantage that a burr or rough edge is formed along the inner periphery of the cut. Obviously, there are many applications in which such a burr cannot be tolerated, while in many other applications it at least renders the tubing lengths undesirable. Later attempts to improve these lengths of tubing involved grinding off the burr, which of course involves a completely separate step to remove the burr on each of the cut length of tubing. Such an approach is not only time consuming, but also very expensive, and the resulting cut surfaces are still frequently not as smooth as desired.

An improvement over the "screw" machine is one exemplified by the Continental apparatus, in which a mandrel is located down the center of the tubing being cut. This means that the cutting is actually produced by a pinching action between the stationary knife and the inner mandrel. While somewhat alleviating the burr problem on the inside edge, however this approach does not completely eliminate the burr. In addition, the length of the tubing cut varies with the sharpness of the knife or cutter and a jagged cut results.

Still another improvement over the basic "screw" machine is one exemplified by the Burr Oak apparatus, in which the tubing is maintained stationary and the knives are rotated to cut the tube. This approach is also quite expensive, and the inner burr is not eliminated.

The most desirable prior art tube cutting apparatus is that utilizing the "shimmy die" approach. The basic "shimmy die" tube cutting apparatus is disclosed in U.S. Pat. No. 2,627,921, issued to Charles M. Brehm on Feb. 10, 1953. In this type of machine, the cutting action is produced by a pair of cutting dies about the outer periphery of the tubing, the cutting dies being moved eccentrically with respect to each other. A pair of punches are located within the tube and are also adapted to move radially and rotationally with respect to each other, in order to follow the dies during the cutting action. In this fashion, a very clean cut, with minimum burrs, can be achieved.

The Brehm shimmy die machine is now produced by Vulcan Tool Company. In the Valcum Tool version of the Brehm shimmy die machine, a long mandrel is located in and extends along the entire length of the tube to be cut. The mandrel is connected to one of the punches, and a flexible tension rod passes through and interconnects and punches. The punches are securely fashioned to the tension rod, so that the punches may be accurately positioned with respect to the outer cutting dies. Of course, the tension rod that passes through the punches has to be sufficiently flexible to permit the punches to move with respect to each other during the "shimmy" cutting operation. The tube to be cut is fed over the punches and the mandrel for its entire length, and then backed out during the cutting operation. While this Brehm shimmy die machine provides a much better tube cutting action than any previous device, it still is plagued by a number of problems and deficiencies.

One of the obvious difficulties is that due to the front loading (i.e., the insertion or feeding of the tube to be cut over the punches and mandrel from the front), the length of the tube being cut must be accommodated not only on the side of the machine where it passes over the mandrel, but also on the side of the machine from which it is fed. As these tube lengths are often twenty feet, or even greater, this means that over forty feet of space must be provided for the machine. Also, as a consequence of this front-loading procedure, the tube cutting machine cannot be run continuously but must remain inactive while a new length of tube is being fed onto the mandrel. Further, a related problem is that only straight tube can be cut. Since much tubing is provided in a coiled form, this means that the coils must be straightened and cut into manageable lengths before being fed into the machine, with the consequent loss of time and increase in expense.

The long mandrel required in the Brehm shimmy die machine also creates a number of difficulties. It is obvious that when the punches have to be accurately positioned within a tenth of a thousandth of an inch, for the best results, and they are located on an end of a mandrel that is twenty feet or more in length, there are substantial difficulties in positioning the punches with the proper degree of accuracy. This means that when the dies and punches are being changed for a different size of tubing, there is much delay and effort involved in preparing the machine for operation. Also, with the long length of the mandrel, temperature variations are magnified and the tight tolerances of the punches can be adversely affected by even a few degrees change in temperature. This not only relates to ambient temperature changes, but the temperature of the tube stock itself.

Other difficulties are encountered as a result of the interconnection of the punches by the tension rod passing therethrough. For one thing, the construction of the punches with the opening through them for the tension rod makes their production, and hence replacement, cost relatively quite high. Since a different set of punches are needed for each tubing size that is to be cut, this can greatly add to the expense of the machine. In addition, the necessity of passing the tension rod through the punches limits the minimum size of the punches without detracting from the support that they must provide during the cutting operation. Hence, the minimum size tube that can be cut is also limited. Further, the requirement of flexibility of the tension rod passing through the punches means that this member must be relatively small. Consequently, this tension rod is relatively weak and much breakage is encountered.

Other disadvantages of the Brehm shimmy die machine involve the relatively high overall cost of the machine, as well as the necessity for a relatively expensive feed apparatus.

SUMMARY OF THE INVENTION

By means of the present invention, the difficulties encountered with the Brehm shimmy die machines are obviated, while yet maintaining the many desirable features thereof. These desirable results are achieved by inserting the punches into the end of the tube from which the length of tubing is to be cut. A restraining means (or "pig") is utilized to prevent the punches from moving farther along the tube away from the end from which the length of tubing is to be cut. Movement in the other direction is prohibited by a punch positioning mechanism that position the punches in the tube. With this arrangement, the interconnection of the punches by the tension rod running therethrough may be completely eliminated, and the punches are essentially "free floating" or unconnected, but still very accurately positioned with respect to the cutting dies and to each other.

In the apparatus of this invention, a tube to be cut is fed into the machine by an appropriate feeding arrangement. This tube may be either consecutive lengths of straight tube or a continuous coil of tube (which passes through a conventional roll tube straightener before being fed into the machine). The tube is clamped by an appropriate tube clamping arrangement on a movable carriage. The movable carriage serves as a tube advancing arrangement, commonly referred to as an air feed, and the tube clamping may be achieved in any appropriate fashion that will hold the tube without deforming it. In the preferred embodiment disclosed herein, the tube clamping is achieved by a movable block actuated by a clamp actuating arrangement (e.g., an electromagnetic device such as a solenoid air valve). The movable carriage or advancing arrangement is actuated by an appropriate drive actuating mechanism to advance the tube a predetermined amount that establishes the length of tubing to be cut from the tube. The drive actuating mechanism for the movable carriage may be any appropriate type of such mechanism, although in the preferred embodiment disclosed herein, the drive mechanism is achieved by a pair of electromagnetic devices, such as solenoid air valves. The amount by which the tube is advanced, and hence the establishment of the length of tubing to be cut, is achieved by movable stop member that limits the extent of motion of the movable carriage.

As the tube is advanced, it passes through a stationary snubbing or locking member that holds the tube in the advanced position, after advancement thereof by the movable carriage, and during the cutting action. The actual arrangement by which the tube is locked or snubbed may be any appropriate type of device, but in the preferred embodiment disclosed herein, the snub actuating arrangement is an electromagnetic device, such as a solenoid air valve, which drives a movable block.

As the tube is advanced, it passes through outer cutting dies and over inner punches. The outer cutting dies are arranged for eccentric ("shimmy") motion relative to each other, in this case by having one die remaining stationary while the other die is moved in an eccentric path with respect thereto. Any appropriate type of shimmy actuating arrangement may be used to drive the movable die in an eccentric path, but in the preferred embodiment disclosed herein, a pair of electromagnetic devices, such as solenoid air valves, are utilized to impart consecutive vertical and lateral movement to the movable dies. The cutting ends of the cutting dies adjacent each other have the same relative position with respect to the plane along which the tube is to be cut (i.e., are equidistant from this plane). The spacing (cutting clearance) of the dies from the plane of the cut permits passage of a debris-carrying lubricant expelled or pumped from the punches.

As the tube is advanced, the relative motion between the tube and the punches is achieved by a punch positioning mechanism that prevents the punches from moving longitudinally with the tube. The punch positioning mechanism also prevents movement of the restraining device located on the other end of the punches away from the punch positioning member. The restraining device serves to prevent movement of the punches along the pipe during the cutting operation, so that the cutting ends of the punches adjacent one another are accurately maintained within the plane along which the tube is to be cut, as a result of the action of the restraining device and the punch positioning mechanism. The restraining means may take any appropriate shape or form that permits forcible movement along the tube during advancement of the tube, but which securely positions the punches during the cutting operation, with the resistance to movement being adjustable. Also, a centering arrangement is utilized to return said punches to coaxiality upon completion of the cutting action.

The punch positioning mechanism may also take any appropriate form, although in the preferred embodiment disclosed herein it takes the form of a well supported rod reciprocably driven by a pneumatic positioning actuating arrangment (e.g., an electromagnetic device actuated drive such as a solenoid air valve). After advancement of the tube by the movable carriage through the dies, the punch positioning member or rod is reciprocated. Upon retraction of the punch positioning member, a tubing extraction device engages the last cut piece of tubing to extract it from the punch positioning member to permit it to be discharged from the machine. The punch positioning member is then returned to the forward position for accurately positioning the punches during the cutting operation. The tube is then advanced once again, after which the punch positioning member is again reciprocated.

From the foregoing generalized discussion of this invention, it may be seen that the difficulties of the Brehm shimmy die machine have been resolved by use of the restraining device which permits the tube to be passed forwardly over the punches when utilized in connection with the punch positioning mechanism. Thus, the whole concept of front end loading and the attendant problems discussed above may be completely eliminated. This means that the cost of the machine, the cost of the feeding equipment, the cost of operating the machine, the space required for the machine and the time required to obtain a desired number of lengths of tubing are all greatly reduced.

Some idea of the savings that are realized can be seen from the fact that the cost of a set of dies and punches for a given size of tube can be reduced by a factor of ten to one (10:1). Also, the overall cost of the cutting mechanism, the feed apparatus, and dies and punches for fine tube sizes can be reduced by over Fifty Percent (50%). In addition, the accuracy of the length of the tubing cuttings is increased, and much smaller diameter tubes and thicker walled tubes may be cut.

For example, with the Brehm shimmy die machine, the tube wall cannot exceed Six Percent (6%) of the tube diameter, while the present invention, tube wall up to Twenty-Two Percent (22%) of the tube diameter can be cut. Thus, for a tube having an outside diameter of one inch, the apparatus of the present invention can cut such a tube having a wall thickness up to 0.220 inch. These can all be achieved in spite of relatively large ambient temperature variations or relatively large changes in temperature of the tube stock being cut. Further, the precision and size capability advantages are achieved at the same time that the machine is rendered capable of accepting consecutive lengths of tube stock or even coiled tube stock. Still further, all these advantages are realized at the same time that the machine is made considerably safer to operate.

These and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

FIG. 1 is a front left perspective view of the tube cutting apparatus of this invention.

FIG. 2 is an enlarged right front perspective view of a portion of the apparatus of FIG. 1.

FIG. 3 is a front elevational view of the apparatus of FIG. 2.

FIG. 4 is a top plan view of the apparatus in FIG. 2.

FIG. 5 is an enlarged cross-sectional view taken along line 5—5 of FIG. 4.

FIG. 6 is a cross-sectional view taken along line 6—6 of FIG. 5.

FIG. 7 is an enlarged cross-sectional view taken along line 7—7 of FIG. 4.

FIG. 8 is a cross-sectional view taken along line 8—8 of FIG. 7.

FIG. 9 is an enlarged cross-sectional view taken along line 9—9 of FIG. 4.

FIG. 11 is a cross-sectional view taken along line 11—11 of FIG. 10.

FIG. 12 is a cross-sectional view taken along line 12—12 of FIG. 10.

FIG. 13 is a cross-sectional view taken along line 13—13 of FIG. 10.

FIG. 14 is a cross-sectional view taken along line 14—14 of FIG. 10.

FIG. 15 is an enlarged exploded view of the punches and centering mechanism therefor.

FIG. 16 is an enlarged exploded view of the adjacent ends of the cutting dies.

FIG. 17 is a partial cross-sectional view showing the cutting dies and punches immediately prior to the cutting operation.

FIG. 18 is a view similar to FIG. 17 illustrating the cutting action.

FIG. 19 is an end view of a cut length of tubing.

FIG. 20 is a partially broken away elevational view of one form of restraining device.

FIG. 21 is an elevational view of another form of restraining device.

FIG. 22 is an elevational view of another form of restraining device.

FIG. 23 is an elevational view of another form of restraining device.

FIG. 24 is an elevational view of another form of restraining device.

FIG. 25 is a portion of the cross-sectional view of FIG. 10 illustrating a lengthened form of the restraining device to support the tube when clamped and snubbed.

FIG. 26 is a chart illustrating the effects of temperature on the tube cutting apparatus of this invention.

DETAILED DESCRIPTION OF THE PREFERRED EMBODIMENT

Figure 10:
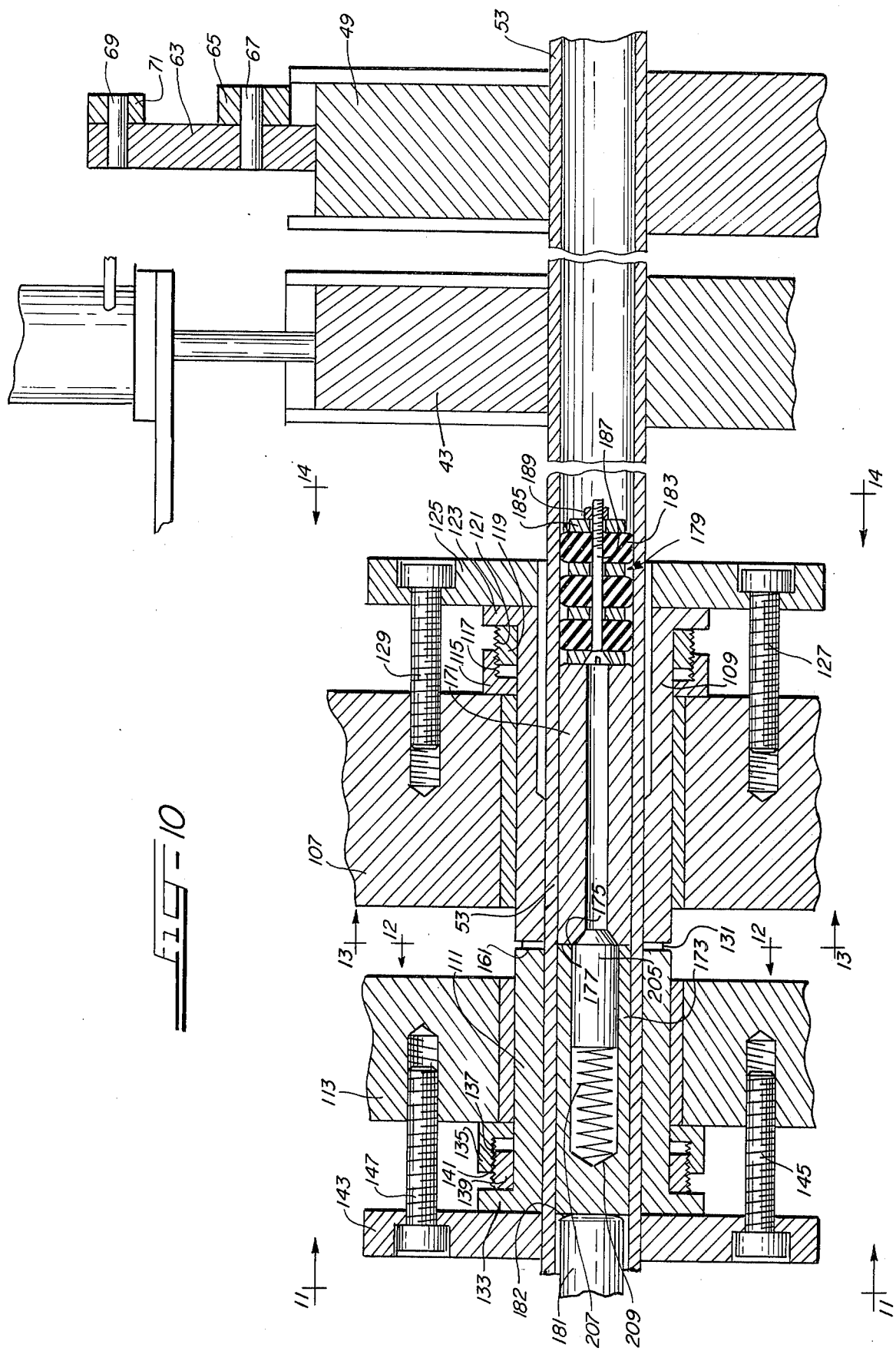
FIG. 10 is an enlarged cross-sectional view taken along line 10—10 of FIG. 4.

With reference now to the FIGS. 1 and 2, a tube cutting apparatus 31 constructed in accordance with the present invention may be seen. The tube cutting apparatus 31 is mounted on a table 33, which is supported in any strong and durable fashion. In this particular embodiment, an I-beam construction 35 with a heavy metal legs 37 is utilized.

A stationary end plate 39 is rigidly connected by means of a plate 41 to a second stationary end plate 43. Plate 41 is rigidly connected to table 33, such as by a suitable number of bolts. By loosening plate 41 from table 33, the entire subassembly of plates 39, 41 and 43, with the elements mounted thereon, may be removed as a unit.

A pair of mounting rods or rails 45 and 47 extend between plates 39 and 43. These mounting rails 45 and 47 are securely fastened to the end plates 39 and 43, such as by ball joint or any other suitable connection. The mounting rails 45 and 47 support a movable carriage 49 that is adapted to move between a stop member 51 and plate 43. Stop member 51, also mounted on rails 45 and 47, may be adjustably positioned by bolts 50 and 52 extending through plate 39, so that the length of travel between stop member 51 and plate 43 may be adjustably determined. This length of travel will determine the length of the tubing cut from the tube.

Movable carriage 49 is adapted to slidably move along the mounting rails 45 and 47. During this movement of the carriage 49, the tube 53 to be cut is clamped by the carriage 49. The clamping arrangement may be better seen in FIGS. 5 and 6. From FIG. 5, it may be seen that the clamping mechanism includes a semi-circular opening 55 in the carriage 49. A vertically movable block 57 has a similar semi-circular opening 59 spaced from the semi-circular opening 55. The tube 53 passes between the semi-circular opening 55 and 59, and upon downward movement of the plate 57 the tube 53 is clamped for movement with the carriage 49.

The block 57 of carriage 49 is normally biased upwardly by bias springs 61. A pivot arm 63 is pivotably mounted in block 65 by a pivot pin 67. Pivot arm 63 is also pivotably connected by a pivot pin 69 to the actuator 61 of a solenoid air valve 73. Solenoid air valves 73 is mounted on carriage 49 by a suitable bracket 75. Upon initiation of the movement of carriage 49 from stop 51 towards plate 43, solenoid 73 is actuated to drive pivot arm 63 to the position shown in FIG. 5. This motion of pivot arm 63 results in the rounded end 77 thereof bearing against block 57 to force it downwardly and clamp the tube 53. A suitable stop 79 limits the motion of the pivot arm 63.

Any suitable drive mechanism may be utilized to move the carriage 49 from adjacent stop 51 to plate 43. In this particular preferred embodiment, however, the drive mechanism consists of a pair of solenoid air valves 81 and 83. The actuators of drive solenoids 81 and 83 are connected to ears 85 and 87 on carriage 49 by drive rods 89 and 91, respectively. Actuation of solenoid drives 81 and 83 results in carriage 49 moving from stop 51 to plate 43, at which point clamping solenoid 73 is deactivated and clamping block 57 rises under the force of bias springs 61 to release the tube.

At the time that the tube 53 is released by the clamping mechanism of carriage 49, the tube is snubbed or locked by a suitable snubbing arrangement in stationary plate 43. This snubbing arrangement is similar to the clamping arrangement of carriage 49 and is illustrated in greater detail in FIGS. 7 and 8. A snubbing block 93 has a semi-circular opening 95, which corresponds to a similar semi-circular opening 97 in plate 43 opposite the semi-circular opening 95 in snubbing block 93. A suitable drive for the snubbing block 93 is utilized, such as a snubbing solenoid air valve 99. Solenoid 99 is mounted on a Z-shaped bracket 101 above the snubbing block 93. The actuator 103 of solenoid air valve 99 is connected to a suitable extension 105 connected to the snubbing block 93. Upon release of the tube 53 by the clamp mechanism of movable carriage 49, the snubbing solenoid 99 is actuated to force the semi-circular opening 95 in block 93 toward the semi-circular opening 97, and hence snub or lock the tube 53 in that position. At this point, the movable carriage 49 may be reciprocated back to its rest position adjacent to stop 51. The tube 53 will be kept in the snubbed position until termination of the cutting operation, at which point solenoid 99 will be deactivated to permit the tube 53 to be urged through block 43 during the advancement of carriage 49.

Z-shaped mounting bracket 101 is located on a stationary die member or plate 107. Stationary die member or plate 107 has a cutting die 109 located therein, while a second cutting die 111 is located in a movable shimmy plate 113. A pair of stationary blocks 114 holds the shimmy plate 113. With reference now to FIG. 10, it may be seen that the cutting die 109 is adjustably mounted with respect to stationary plate 107. A nut 115 having threads 117 and a companion ring 119 having threads 121, threads 117 and 115 being adapted to mesh, are located between a projecting flange or arm 123 of die 109 and the stationary plate 107. A smaller positioning plate 125 is connected to the stationary plate 107 by means or bolts 127 and 129. Plate 125 bears against the projecting portion or flange 123 of the cutting die 109 to force it toward the left in the orientation of FIG. 10. End 131 of cutting die 109 may be positioned at the desired location by meshing the threads 117 and 121 the desired amount and then forcing plate 125 against the die 109 by tightening bolts 127 and 129. This firmly secures the end 131 of the die 109 at the desired position. However, when it is desired to sharpen the die 109, with the consequent loss of material at end 131, the threads 117 and 121 may be further meshed to decrease the distance between projecting flange or arm 123 and plate 107. Bolts 127 and 129 can then be tightened to again return end 131 to the desired location, if the proper meshing of threads 117 and 121 has been achieved. In this fashion, the precise location of end 131 of die 109 may be consistently and rigidly maintained, but at the same time adjustment of the positioning is provided for.

An identical type of arrangement is provided for cutting die 111. A projecting flange 133 of die 111 has a nut 135 with threads 137 and a ring 139 with threads 141, threads 137 and 141 being adapted to mesh, located between it and plate 113. A positioning plate 143 engages the cutting die 111 is a forcible manner upon tightening of bolts 145 and 147. End views of flange 123 and positioning plate 143 may be seen in FIGS. 14 and 11, respectively.

The shimmy plate 113 is a movable plate which moves the cutting die 111 in an eccentric fashion with respect to cutting die 109 to produce the desired cutting of tube 53. Any type of suitable eccentric die actuating or shimmy actuating drive may be utilized, but as seen in FIG. 9 this preferred embodiment utilizes a pair of electromagnetic devices, such as solenoid air valves 149 and 151 to impart an eccentric motion to shimmy plate 113. Plate 113 is pivotably connected to an actuator 151 of solenoid 149 and to a clevis 153 connected to the actuator of solenoid 151. A lockout 155 connects clevis 153 to the actuator of solenoid 151. When it is desired to cut the tube 53, solenoid 149 is actuated to move plate 113 toward the right in FIG. 9. When the actuator of solenoid 149 has been extended to its maximum position, solenoid 151 is actuated to impart an upward motion to plate 113 in the orientation of FIG. 9. The solenoids are then deactivated in sequence to complete the eccentric shimmy motion of plate 113. The sequence and direction of motions indicated for solenoids 159 and 151 are purely illustrative, and any suitable combination of these may be utilized.

It should be noted that the motions imparted to shimmy plate 113 are actually quite small in total length, and hence it is desirable to positively limit these motions. One way of accomplishing this is to use suitable stop screws, such as those shown at 157, to limit the motion of the solenoid actuator 159. Similar stop screws may be utilized at the other end of the solenoid, or the piston may merely be made sufficiently long to bottom against the solenoid casing after the desired travel distance.

On the inside of tube 53 there are located two punches, 171 and 173. Punches 171 and 173 support the inner portion of the tube during the shimmy cutting action. To do this, they must, of course, be free to move relative to one another. As these punches 171 and 173 are completely unconnected, or "free floating", with respect to each other, this requirement presents no difficulties. In addition, the end surfaces 175 and 177 of punches 171 and 173, respectively (FIG. 16), must be maintained in the plane in which the tube is to be cut (i.e., midway between the die surfaces 167 and 169.) This is achieved by means of a restraining device 179 (or "pig") and a punch positioning member or rod 181.

Small particles or debris can collect between the end surfaces 175 and 177 of punches 171 and 173. If not removed, these particles can pit and scar the punches to the point that they become unusable and must be replaced at undesirably frequent intervals. The "free floating" nature of the punches of this invention permits a self-cleaning process which obviates, or at least greatly alleviates, this problem. As the punches 171 and 173 are moved relative to one another during the cutting action, lubricant between the punches is forcibly expelled or pumped from between punches 171 and 173. The flow of this lubricant across surfaces 175 and 177 cleans these surfaces and carries the undesired particles outward, thus greatly increasing the life of the punches 171 and 173. In order for the debris-carrying lubricant to be able to be expelled from between punches 171 and 173, provision must be made for flow of this debris-carrying lubricant between end 131 of die 109 and end 161 of die 111. An arrangement for permitting such flow is illustrated in the exploded view of FIG. 16. A pair of slightly projecting members 163 and 165 separate surfaces 167 and 169 of ends 131 and 161 of dies 109 and 111. The resulting passageway permits flow of the debris-carrying lubricant between the dies 109 and 111, and thus permits self-cleaning action of punches 171 and 173.

The restraining device 179 is an extremely important feature of this invention. The particular form of restraining device illustrated in the preferred embodiment of this application is best shown in FIG. 10, where it may be seen that the restraining device is a number of resilient sections 183 separated and bounded by rigid portions 185. A bolt 187 passes down the center of the restraining device assembly and has a holding and tightening nut 189 at one end thereof. By loosening or tightening the nut 189, the resilient members 183 may be compressed or allowed to expand to provide the desired resistance to movement through the tube 53. Of course, it should be recognized that instead of the multiple resilient devices 183, a single such resilient section could be utilized, or as many such resilient sections as is desired or necessary for any particular application. In addition, it is not necessary to have all of the resilient sections combined into a single unit as disclosed in FIG. 10, but each resilient section may be separately compressed or expanded to give the desired resistance, and then placed in the tubes sequentially. In addition, there are many other forms that such a restraining device could take. It is also necessary to insure that the restraining device 179 does not prevent lubricant flow along the axial length of the tube. This may be accomplished by preventing the resilient section 183 from conforming to the inner perimeter of the tube. In this preferred embodiment, a cross-sectional view transverse to that of FIG. 10 would reveal that resilient sections 183 are octagonally shaped.

In FIGS. 20–22, three other forms of restraining devices are illustrated. In FIG. 20, a shell 191 of a resilient material such as urethane with a bolt 193 passing through it and a tightening nut 195 at one end of it can be utilized. Tightening the nut 195 will deform the resilient material to provide the desired resistance. In a very similar form illustrated in FIG. 21, instead of a urethane or resilient material, strips of flexible metal 197, somewhat resembling an eggbeater, can be utilized with a bolt 199 and a nut 201 to provide the desired restraining resistance. Still another embodiment of the restraining device is illustrated in FIG. 22, in the form of a helical spring 203. By making the helical spring with a natural diameter somewhat larger than the tube, twisting the spring into the tube will cause it to seat in the tube with a considerable amount of resistance. The desired amount of resistance can be achieved by giving the spring an appropriate diameter with other respect to the diameter of the tube.

Other types of restraining devices illustrated in FIGS. 23 and 24 include a magnetic arrangement, with a coil 251 around the outer portion of the tube to cause a piece of magnetic material 253 in the tube to resist movement, and a pneumatically expanded bladder or ball arrangement 255. Still another possibility would be to utilize biased cups, which could be pneumatically or hydraulically biased from the stock tube feeding end in a periodic fashion.

While FIG. 10 depicts the restraining device extending only a short distance down the tube 53, for thin walled tubes it is frequently desirable to provide support under the clamping and snubbing elements. Hence, as illustrated in FIG. 25, restraining device 179 can be extended to provide internal support for the tube under these elements. It should be noted, however, that the restraining device should not be extended farther than stop plate 51.

It may be noted that the punches 171 and 173 are centered with respect to each other by means of spring-biased centering plug 205. This centering arrangement may be better seen in the exploded view of FIG. 15. It should be noted that the centering plug 205 is biased by a spring 207 (or any other type of resilient member), both of which are located in a cavity 209 in punch 173 (although the resilient member could be located elsewhere, such as by attaching the plug to a rod extending through the punch and biasing from the other side of the punch, which would be especially useful in connection with small tubes so as not to weaken the cutting end of the punch). It may be seen that the centering plug 205 has a convex frusto-conical surface 211, which is adapted to mate with a concave frusto-conical surface 213 on punch 171. A groove 215 is formed on the side of the plug 205 to permit the passage of air. When the punches are inserted into the tubes, the relatively weak spring 207 causes the centering plug 205 to engage punch 171. The frusto-conical surfaces 211 and 213 mate to accurately center the punches 171 and 173 with respect to each other. During the cutting operation, displacement of the punch 173 results in the frusto-conical surfaces 211 and 213 wedging the plug 205 back against the relatively weak force of spring 207, so as not to interfere with the relative motion between the punches 171 and 173. It should also be noted that the punches 171 and 173 move slightly (or "hitch") with respect to each other during the cutting operation, so that a self-cleaning operation is performed as described above. Upon completion of the cutting cycle, the centering plug 205 causes the punches 171 and 173 to be accurately realigned with each other. Although the clearance between the punches and the tube is very small, the tube cannot be counted upon to accurately realign the punches after a cut, and thus this centering plug is very important to prevent jamming of the machine.

With respect to the punch positioning member 181, it may be seen that it is a portion of a punch positioning mechanism 215. It may also be seen that the punch positioning mechanism includes a pair of supporting blocks 217 and 219 for the punch positioning member or rod 181. These blocks support the punch positioning rod 181 and accurately align its axis of travel during the punch positioning process. The punch positioning rod 181 is actuated by an appropriate punch positioning drive arrangement 221. In this case, the preferred enbodiment disclosed herein utilizes an electromagnetic device, such as a solenoid air valve, as the punch positioning drive arrangement. Also, it may be noted that the end of rod 181 that abuts punch 173 (FIG. 10) is broken away or rounded at 182. The reason for this is that a sharp edge at 182 could result in breakage of rod 181 during the cutting operation, and hence the rounded edge 182 serves to protect punch positioning rod 181.

An interesting observation on the punch positioning rod 181 is that it not only properly positions the punches prior to the cutting operation, but during the cutting operation it serves to maintain the punches in the proper orientation throughout the eccentric motion process. This feature may be observed in FIGS. 17 and 18. In FIG. 17, the punch positioning rod 181 is holding the punches in their proper position against the resistance of resistance of restraining device 179 prior to commencement of the cutting operation. In FIG. 18, it may be seen that as punch 173 is moved through its eccentric motion the bending of the punch positioning rod 181 results in less of the end surface bearing against punch 173, but that the portion that does bear against punch 173 remains in the same plane to keep punch 173 accurately in engagement with punch 171.

Upon retraction of punch positioning rod 181, the cut lengths of tubing are extracted for discharge from the machine. This could be accomplished in any suitable fashion, but the tubing extraction device utilized in this preferred embodiment is a tubing engaging finger 257 (See: FIG. 2) mounted on block 217. This finger 257 abuts the rod 181 and engages the end of a length of tubing to strip it from rod 181 during the retraction stroke.

In FIG. 19, an end view of a tubing length cut by the machine disclosed herein has the typical appearance of a shimmy die cut, with a cut area 223 and a sheared area 225. It may be seen that the final cut is a very clean one, with no burrs on either the inner or outer peripheries of the cut.

While the particular circuitry utilized to control the solenoids in this preferred embodiment is not disclosed, it should be recognized that such circuitry is conventional and may easily be supplied by anyone skilled in the art. All that is necessary is to know the sequence of events, as described herein.

The sequence of operation is now readily observable. Upon initiation of the operation of the apparatus, the tube 53 to be cut is clamped by the block 57 on movable carriage 49 by activation of solenoid 73. Carriage 49 is then moved from stop 51 to plate 43 by the drive solenoids 81 and 83. When carriage 49 reaches plate 43, the tube 53 is snubbed by block 93 as a result of actuation of solenoid 99. The carriage 49 is then returned to stop 51. Also at this time, after the tube has been snubbed, solenoid 221 is actuated to retract punch positioning rod 181 so that the length of tubing cut by the last preceding cutting operation may be extracted by finger 257 for discharge from the machine. Punch positioning rod 181 is then returned to contact punch 173. At this time the eccentric motion producing shimmy solenoids 149 and 151 are actuated to cause the shimmy cut. After the tube has been cut and plate 113 returned to its normal position, the machine is ready for the next cycle of operation.

With reference to FIG. 26, three temperature variation curves, A, B and C are shown for a selected type of steel. Curve A is a straight length versus temperature variation for a one inch length of steel, with the length shown on axis D and the Fahrenheit temperature change shown on axis E. Curves B and C are for three inch lengths and fourteen inch lengths, respectively, versus curve A, with the lengths appearing on axis F and G, respectively. These latter lengths are chosen because in a typical situation these lengths are representative of the lengths of the punches 171 and 173 and the punch positioning rod 181, respectively. From these curves, it may be seen that an 80° temperature change produces only a 1.44 thousandths of an inch change in length of the three inch steel member, and only a 6.72 thousandths of an inch change in length of the fourteen inch steel member. Also, a 5 thousandths change for the fourteen inch member and a 1 thousandth change for the three inch member occur as a result of 61° and 56° temperature changes, respectively. When these changes are thought of in comparison to the changes of a twenty foot mandrel, the importance of this factor is obvious. The present invention is capable of handling a 30° change in temperature without difficulty, while even a few degrees change can render the Brehm shimmy die machine inoperative.

It should be understood that various modifications, changes and variations may be made in the arrangements, operations and details of construction of the elements disclosed herein without departing from the spirit and scope of this invention.

I claim:
1. Apparatus for cutting a tube into desired lengths of tubing comprising:
   cutting dies mounted adjacent the outside of the tube;
   die actuating means to produce relative motion between said dies with respect to the radial and circumferential dimensions of the tube;
   punches located inside of the tube generally opposite said cutting dies;
   restraining means forcibly movable in the tube; and
   punch positioning means insertable through the end of the tube from which the length of tubing is to be cut to force and retain said punches against said restraining means during cutting of the tube, said restraining means having sufficient resistance to movement to maintain said punches between said restraining means and said punch positioning means and in the proper axial positions with respect to said cutting dies during cutting of the tube.
2. Apparatus as claimed in claim 1 wherein:
   said dies are first and second generally cylindrical annular members each having a cutting end, said cutting ends of said dies lying equidistant from a plane in which the tube is cut, said dies being driven with an eccentric shimmy motion; and
   said punches are first and second generally cylindrical members opposite said cutting dies and having cutting ends lying in the plane along which the tube is cut.
3. Apparatus as claimed in claim 2 and further comprising centering means to return said punches to a co-axial state after cessation of the cutting action in order to prevent jamming of the apparatus as the tube is advanced for a subsequent cut.
4. Apparatus as claimed in claim 3 wherein said centering means comprises:
   cavity in said first punch;
   a centering plug located in said cavity and having a convex frusto-conical surface at one end thereof;
   a concave frusto-conical surface formed in said second punch; and
   resilient means to urge said frusto-conical surface of said centering plug into engagement with said frusto-conical surface of said second punch.
5. Apparatus as claimed in claim 2 and further comprising spacing means located on said cutting end of said first die to abut against said cutting end of said second die to form a passageway between said cutting ends of said dies to provide for the flow of debris-carrying lubricating and cleaning fluid from said punches through said passageway.
6. Apparatus as claimed in claim 2 and further comprising an adjustable die positioning means for each of said dies, each of said die positioning means comprising:
- a threaded ring;
- a threaded nut, the threads of said ring and said nut being adapted to mesh, said ring and said nut being located between a radially extending flange, formed on the end away from said cutting end of the associated die, and a mounting plate;
- a positioning plate abutting said flange; and
- adjusting bolts extending through said positioning plate to said mounting plate,
- whereby increasing the amount of meshing between the threads of said ring and said nut decreases the axial length of the ring and nut combination, and subsequent tightening of said bolts results in repositioning of the associated die.

7. Apparatus as claimed in claim 1 wherein said restraining means comprises:
- at least one resiliently compressible member;
- non-compressible plates on each end of said compressible member; and
- resistance determining means to establish the desired degree of resistance to forcible movement of said restraining means through the tube by varying the compression of said compressible member.

8. Apparatus as claimed in claim 7 wherein said resistance determining means comprises a bolt extending through said compressible member and a nut at one end of said bolt.

9. Apparatus as claimed in claim 7 wherein said compressible member comprises a shell of resilient material such as urethane, said shell having a cross-sectional shape that permits flow of lubricant therealong.

10. Apparatus as claimed in claim 7 wherein said compressible member comprises strips of a flexible metal.

11. Apparatus as claimed in claim 7 and further comprising a plurality of said compressible members, each of said members comprising a substantially solid ring of a resilient material, each of said rings having a cross-sectional shape that permits flow of lubricant therealong.

12. Apparatus as claimed in claim 1 wherein said restraining means comprises a helical spring having an unforced diameter larger than the diameter of the tube.

13. Apparatus as claimed in claim 1 wherein said restraining means comprises a magnetic member in the tube and an electromagnetic device outside the tube.

14. Apparatus as claimed in claim 1 wherein said restraining means comprises an air-inflated bladder.

15. Apparatus for cutting tubes into desired lengths of tubing comprising:
- feeding means for advancing a tube, from which a desired length of tubing is to be cut, a predetermined distance;
- snubbing means to hold the tube in the advanced position;
- first and second dies positioned about the outside of the tube, each of said dies having a cutting end, said cutting end of said first die and said cutting end of said second die being adjacent one another and having the same relative disposition with respect to the plane along which the tube is to be cut;
- first and second unconnected punches having first and second ends and located inside the tube generally opposite said first and second dies;
- restraining means forcibly movable in the tube;
- punch positioning means inserted through the end of the tube from which the desired length of tubing is to be cut to forcibly hold said punches against said restraining means upon advancement of the tube, with said first end of said first punch and said first end of said second punch abutting one another in the plane along which the tube is to be cut, said restraining means and said punch positioning means insuring maintenance of an accurate alignment of said first ends of said punches in the plane along which the tube is to be cut during the cutting action; and
- cut actuating means to produce relative eccentric motion between said first and second dies to cut the tube, said punch positioning means being actuatable for retraction to permit extraction of the cut length of tubing and for reinsertion into the tube to retain said punches during the cutting action.

16. Apparatus as claimed in claim 15 wherein said feeding means comprises:
- a reciprocally movable carriage to advance the tube;
- drive actuating means to reciprocate said carriage;
- clamping means on said carriage to releasably clamp the tube; and
- clamp actuating means to cause said clamping means to grasp the tube during the forward advancement of said carriage and to release the tube during the return motion of said carriage.

17. Apparatus as claimed in claim 16 and further comprising adjustable stop means to determine the distance advanced by said carriage and hence the length of tubing cut.

18. Apparatus as claimed in claim 15 wherein said snubbing means comprises:
- a snubbing plate; and
- snub actuating means to cause said snubbing means to grasp the tube after the advancement of the tube, said snubbing means continuing to grasp the tube until just before commencement of the next advancement of the tube.

19. Apparatus as claimed in claim 15 and further comprising centering means to return said punches to accurate co-axially after the cutting action.

20. Apparatus as claimed in claim 15 and further comprising tubing extraction means to engage the cut length of tubing during the retracting of said punch positioning means to strip the length of tubing from said punch positioning means for discharge from the apparatus.

21. Apparatus for cutting tubes into desired lengths of tubing comprising:
- a reciprocally movable carriage to advance a tube from which a desired length of tubing is to be cut;
- drive actuating means to reciprocate said carriage;
- clamping means on said carriage to releasably grasp the tube;
- clamp actuating means to cause said clamping means to grasp the tube during the forward advancement motion of said carriage and to release the tube during the return motion of said carriage;
- a snubbing plate limiting advancement of said carriage;
- an adjustable stop means to variably establish the length of travel of said carriage between said stop means and said snubbing plate and hence determine the length of tubing to be cut from the tube;
- snubbing means on said snubbing plate to releasably grasp the tube;

snub actuating means to cause said snubbing means to grasp the tube after advancement of said carriage has been stopped by said snubbing plate and before said carriage starts its return motion, said snubbing means grasping the tube until just before the commencement of the next carriage advancing motion;

first and second generally annular cylindrical cutting dies located about the outer periphery of the tube, cutting ends of dies being adjacent one another equidistant from a plane along which the tube is cut;

first adjustable die positioning means to fasten said first die to a movable shimmy plate;

second adjustable die positioning means for fastening said second die to a stationary die plate, said adjustable die positioning means precisely locating said dies and yet permitting variation of the location in the event of material loss on the dies from sharpening;

first and second generally cylindrical unconnected punches located on the inside of the tube opposite said dies, cutting ends on said punches abutting one another in the plane along which the tube is cut;

restraining means forcibly movable through the tube during the advancement thereof but providing sufficient resistance to movement during the cutting action to maintain said punches accurately aligned with the plane in which the tube is cut, said restraining means located on the side of said punches toward the end from which the tube is advancing;

punch positioning means insertable through the end of the tube from which the length of tubing is to be cut to hold said dies and said restraining means during the advancement of the tube and to maintain the positioning of said punches against said restraining means during the cutting action;

shimmy actuating means to impart an eccentric motion to said shimmy plate and hence to said first die to produce the cutting action;

punch centering means to restore co-axially of said punches after the cutting action and before the next advancement of the tube;

punch positioning actuating means to retract said punch positioning means after advancement of the tube and to reinsert said punch positioning means into the tube before the cutting action commences; and tubing extraction means to engage the cut length of tubing during the retracting of said punch positioning means to strip the length of tubing from said punch positioning means for discharge from the apparatus.

22. Apparatus as claimed in claim 21 and further comprising:
a first end plate; and
a pair of rails extending between said first end plate and said snubbing plate, said movable carriage mounted for motion on said rails.

23. Apparatus as claimed in claim 22 wherein said stop means comprises:
a stop plate mounted on said rails for movement therealong; and
stop adjusting bolts extending through said end plate to engage said stop plate and vary the location thereof along said rails.

24. Apparatus as claimed in claim 21 wherein all of said actuating means comprise electromagnetic devices.

25. Apparatus as claimed in claim 24 wherein said electromagnetic devices comprise solenoid air valves.

26. Apparatus as claimed in claim 21 wherein said clamping means and said snubbing means comprise, respectively:
semi-circular openings in said carriage and said snubbing plate; and
vertically movable plates mounted above said semi-circular openings, said plates having semi-circular openings corresponding to said semi-conductor openings in said carriage and said snubbing plate, downward actuation of said plates by said clamp actuating means and snub actuating means resulting in clamping and snubbing, respectively of the tube.

27. Apparatus as claimed in claim 21 and further comprising spacing means located on said cutting end of said first die to abut against said cutting end of said second die to form a passageway between said cutting ends of said dies to provide for the flow of a debris-carrying lubricating and cleaning fluid from said punches through said passageway.

28. Apparatus as claimed in claim 21 wherein said adjustable die positioning means each comprises:
a threaded ring;
a threaded nut, the threads of said ring and said nut adapted to mesh, said ring and said nut being located between a radially extending flange, formed on the end away from said cutting end of the associated die, and said stationary die plate and said shimmy plate, respectively;
positioning plate abutting said flange; and
adjusting bolts extending through said positioning plate to said stationary die plate and said shimmy plate, respectively,
whereby increasing the amount of meshing between the threads of said ring and said nut decreases the axial length of the ring and nub combination, and subsequent tightening of said bolts results in repositioning of the associated die.

29. Apparatus as claimed in claim 21 wherein said punch centering means comprises:
a cavity in said first punch;
a centering plug located in said cavity and having a convex frusto-conical surface at one end thereof;
a concave frusto-conical surface formed in said second punch; and
resilient means to urge said frusto-conical surface of said centering plug into engagement with said frusto-conical surface of said second punch.

30. Apparatus as claimed in claim 29 wherein a groove is formed in said plug along with the length thereof to permit entrapped air to escape without interfering with the engagement of said frusto-conical surfaces.

31. Apparatus as claimed in claim 21 wherein said shimmy actuating means comprises a pair of solenoid air valves adapted to sequentially drive said shimmy plate in transverse directions to produce said eccentric motion.

32. Apparatus as claimed in claim 21 wherein said restraining means comprises:
a plurality of resiliently compressible members;

a plurality of non-compressible spacers separating and bounding and resiliently compressible members; and resistance determining means to establish the desired degree of resistance to forcible movement of said restraining means through the tube by varying the compression of said compressible members.

33. Apparatus as claimed in claim 21 wherein said restraining means is located generally opposite said clamping means and said snubbing means to prevent deformation of the tube.

34. Apparatus for cutting a tube into desired lengths of tubing comprising:

cutting dies mounted adjacent the outside of the tube;

die actuating means to produce relative motion between said dies with respect to the radial and circumferential dimensions of the tube;

punches located inside of the tube generally opposite said cutting dies;

restraining means movable in the tube during advancement of the tube and resisting movement during cutting of the tube; and punch positioning means insertable through the end of the tube from which the length of tubing is to be cut to force and retain said punches against said restraining means during cutting of the tube, said restraining means having sufficient resistance to movement to maintain said punches between said restraining means and said punch positioning means and in the proper axial positions with respect to said cutting dies during cutting of the tube.

* * * * *

UNITED STATES PATENT AND TRADEMARK OFFICE
CERTIFICATE OF CORRECTION

PATENT NO. : 4,003,278
DATED : January 18, 1977
INVENTOR(S) : John Tipton Shields It is certified that error appears in the above-identified patent and that said Letters Patent are hereby corrected as shown below:

Column 1, line 27, after "each" insert --end--
           line 65, delete "and" and insert therefor --the--
Column 3, line 4, delete "machines" and insert therefor --machine--
           line 13, delete "position" and insert therefor --positions--
Column 6, line 16, after "with" delete "a"
           line 28, delete "joint" and insert therefor --joints--
Column 7, line 45, delete "or" and insert therefor --of--
Column 8, line 1, delete "is" and insert therefor --in--
           line 15, delete "lockout" and insert therefor --locknut--
           line 45, after "respectively" delete "(FIG. 16)"

Column 11, line 4, after "of" (first instance) delete "resistance of"
            line 17, after "257" delete "(See: FIG.2)"
Column 14, line 43, delete "co-axially" and insert therefor --co-axiality--
Column 15, line 2 after "after" insert --the-- line 42, delete "co-axially" and insert therefor --co-axiality--
Column 16, line 13, delete "semi-conductor" and insert therefor --semi-circular--

Signed and Sealed this

Ninth Day of January 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,003,278

DATED : January 18, 1977

INVENTOR(S) : John Tipton Shields

It is certified that error appears in the above—identified patent and that said Letters Patent are hereby corrected as shown below:

Column 9, line 56, delete "other"

Signed and Sealed this

Twentieth Day of March 1979

[SEAL]

Attest:

RUTH C. MASON
Attesting Officer

DONALD W. BANNER
Commissioner of Patents and Trademarks